US010766607B2

(12) United States Patent
Sakota et al.

(10) Patent No.: US 10,766,607 B2
(45) Date of Patent: Sep. 8, 2020

(54) LANDING GEAR

(71) Applicant: Airbus Operations Limited, Bristol (GB)

(72) Inventors: Nebojsa Sakota, Bristol (GB); Norman Wijker, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 257 days.

(21) Appl. No.: 16/010,728

(22) Filed: Jun. 18, 2018

(65) Prior Publication Data
US 2018/0362150 A1 Dec. 20, 2018

(30) Foreign Application Priority Data

Jun. 19, 2017 (GB) .................................. 1709770.0

(51) Int. Cl.
*B64C 25/12* (2006.01)
(52) U.S. Cl.
CPC ........ *B64C 25/12* (2013.01); *B64C 2025/125* (2013.01)
(58) Field of Classification Search
CPC .......................... B64C 25/12; B64C 2025/125
USPC ...................................... 244/102 R
See application file for complete search history.

(56) References Cited

U.S. PATENT DOCUMENTS

| 1,802,692 A | * | 4/1931 | Zindel | ..................... B64C 25/06 |
| | | | | 244/104 CS |
| 3,086,733 A | * | 4/1963 | Hartel | ..................... B64C 25/14 |
| | | | | 244/102 R |
| 4,170,332 A | * | 10/1979 | Masclet | ................. B64C 25/14 |
| | | | | 244/102 R |
| 4,328,939 A | * | 5/1982 | Davies | .................... B64C 25/12 |
| | | | | 244/102 R |
| 4,345,727 A | * | 8/1982 | Brown | ..................... B64C 25/12 |
| | | | | 244/102 R |
| 4,392,623 A | * | 7/1983 | Munsen | ................. B64C 25/10 |
| | | | | 244/102 R |

(Continued)

FOREIGN PATENT DOCUMENTS

| EP | 0 031 602 | 7/1981 |
| EP | 1 054 804 | 11/2000 |

(Continued)

OTHER PUBLICATIONS

EPO Extended Search Report cited in EP 18177729.3, dated Oct. 17, 2018 7 pages.

(Continued)

*Primary Examiner* — Marc Burgess
(74) *Attorney, Agent, or Firm* — Nixon & Vanderhye P.C.

(57) ABSTRACT

A landing gear is disclosed having a main strut connected at one end to an aircraft via a main joint is disclosed. The landing gear further includes an inboard sidestay assembly connected to the main strut. The inboard sidestay assembly includes a forward stay connected at one end to the aircraft, a rear stay connected at one end to the fuselage, and a shear web extending between the forward stay and the rear stay and configured to resist movement of the forward stay relative to the rear stay. The landing gear is arranged such that when the landing gear is extended substantially all the landing gear loads are transferred from the landing gear to the aircraft via one or more of the main joint, the forward stay and the rear stay.

17 Claims, 3 Drawing Sheets

(56) References Cited

U.S. PATENT DOCUMENTS

| | | | | |
|---|---|---|---|---|
| 4,433,820 | A * | 2/1984 | Turiot | B64C 25/20 |
| | | | | 244/102 R |
| 7,066,429 | B2 * | 6/2006 | Mellor | B64C 25/10 |
| | | | | 244/102 R |
| 7,793,885 | B2 * | 9/2010 | Anderton | B64C 25/12 |
| | | | | 244/102 A |
| 9,145,204 | B2 * | 9/2015 | Ducos | B64C 25/26 |
| 9,308,988 | B2 * | 4/2016 | Otto | B64C 25/10 |
| 10,414,510 | B2 * | 9/2019 | Schmidt | B64C 25/60 |
| 2009/0057484 | A1 | 3/2009 | White | |
| 2013/0020436 | A1 | 1/2013 | Ducos et al. | |
| 2014/0151500 | A1 | 6/2014 | Bellet et al. | |
| 2014/0183785 | A1 | 7/2014 | Masson et al. | |
| 2019/0135416 | A1 * | 5/2019 | Woolcock | B64C 25/04 |

FOREIGN PATENT DOCUMENTS

| | | |
|---|---|---|
| EP | 2 738 088 | 6/2014 |
| EP | 3 135 581 | 3/2017 |
| FR | 2 955 310 | 7/2011 |
| GB | 2 417 933 | 3/2006 |
| WO | 99/42363 | 8/1999 |

OTHER PUBLICATIONS

Combined Search and Examination Report for GB1709770.0, dated Nov. 28, 2017, 8 pages.

* cited by examiner

LANDING GEAR

CROSS RELATED APPLICATION

This application claims priority to United Kingdom (GB) patent application no. 1709770.0, filed Jun. 19, 2017, the entire contents of which are hereby incorporated by reference.

BACKGROUND OF THE INVENTION

The present invention concerns an aircraft landing gear. More particularly, but not exclusively, this invention concerns an aircraft landing gear comprising an inboard sidestay assembly and an aircraft including such a landing gear.

In certain aircraft the main landing gear is mounted on the wing. The wing structure must have sufficient strength to react the landing gear loads at the point or points to which the landing gear attaches. This may limit the choice of materials that can be used in construction and/or lead to the need for the structure to be reinforced, thereby increasing the weight of the aircraft. This is a particular issue for wings using composite materials, for example Carbon Fibre Reinforced Polymer (CFRP) wings, as these materials are typically anisotropic. For example, CFRP materials can withstand higher loading along the fibre length, but may require substantial reinforcement to accommodate off-axis loads. Loads that may be accommodated by a metal structure may therefore require addition reinforcement when that same structure is made using a composite. This may increase the weight of the structure and/or lead to manufacturing difficulties when attempting to lay up composite regions which are very thick, or which have a complicated shape. It would therefore be desirable to provide a landing gear that results in an improved load profile, for example a reduction in the maximum load experienced at the point(s) of attachment to the wing and/or a reduction in off-axis loads transmitted to the wing structure.

One prior art method of reducing the loads experienced at any one point of attachment is to provide a landing gear which transfers loads from the landing gear to the aircraft over multiple attachment points including points on both the wing and the fuselage. EP 0 031 602 describes such a landing gear which is attached to the aircraft at four points, namely via two trunnion bearings at the top of the main strut attaching the landing gear to the wing, a drag strut and a side strut attaching the landing gear to the wing/body. While this four-point structure may produce some loads reduction, significant off axis loads are still transferred to the wing. In particular, when drag loads are transmitted to the wing via the two trunnion bearings (also known as fore and aft pinions) this generates a significant bending movement between the two trunnion joints in the wing.

Typically, modern landing gears are retracted once the aircraft is in flight. Space is at a premium within the envelope of the aircraft and accordingly it is desirable that a landing gear can be retracted into a compact configuration. However, many multiple attachment point landing gears are not particularly compact when retracted and/or are mechanically complex thereby increasing manufacture and/or maintenance costs. It would be advantageous to provide a mechanically simple landing gear that can reduce the landing gear loads transferred to the wing of the aircraft while maintaining a compact configuration when retracted.

The present invention seeks to mitigate one or more of the above-mentioned problems. Alternatively or additionally, the present invention seeks to provide an improved landing gear.

SUMMARY OF THE INVENTION

The present invention provides, according to a first aspect, an aircraft comprising a fuselage and a landing gear. The landing gear may comprise a main strut (also known as a landing gear leg) connected at one end to the aircraft such that landing gear loads can be transferred from the main strut into the aircraft. The landing gear may comprise an inboard sidestay assembly connected to the main strut. The inboard sidestay assembly may comprise a forward stay connected at one end to the aircraft such that landing gear loads can be transferred from the main strut into the aircraft via the forward stay. The inboard sidestay assembly may comprise a rear stay, for example connected at one end to the fuselage such that landing gear loads can be transferred from the main strut into the fuselage via the rear stay. The inboard sidestay assembly may comprise a shear web extending between the forward stay (e.g. front stay) and the rear stay (e.g. aft stay) and configured to resist movement of the forward stay relative to the rear stay, particularly under shear loading. The landing gear may be arranged such that, in use, when the landing gear is extended, substantially all the landing gear loads are transferred from the landing gear to the aircraft via one or more of the main strut and the inboard stay assembly.

Providing a shear web may strengthen the sidestay assembly, for example providing increased rigidity. Additionally or alternatively, there may be improvements in how landing gear loads are transmitted to the aircraft via the sidestay assembly. Additionally or alternatively, providing a shear web between the forward and rear stays may reduce or substantially eliminate movement of the rear stay relative to the forward stay, therefore allowing the stays to control the locus of the landing gear as it retracts. In turn this may facilitate provision of a landing gear wherein the main joint between the upper end of the main strut and the wing is less constrained than in prior art landing gear (for example because a constrained main joint is no longer required to control the locus of the gear during retraction), thereby reducing the magnitude of the landing gear loads transmitted to the aircraft.

Each of the forward stay, rear stay and main strut may be connected to the aircraft to cause landing gear loads to be transferred from the landing gear to the aircraft. Each of the forward stay and rear stay may provide a landing gear load path between the main strut and the relevant points of attachment to the aircraft. The main strut may be connected to the aircraft via a main joint to cause landing gear loads to be transferred from the main strut to the aircraft via the main joint. The main joint may provide a landing gear load path between the main strut and the aircraft. Thus, the landing gear may be configured to have three principle landing gear load paths via which landing gear loads are transferred to the aircraft; the forward stay load path, the rear stay load path and the main joint load path. The landing gear may be configured such that, in use when the landing gear is extended, different components of the landing gear loads are transferred to the aircraft by different ones of the three loads paths.

The aircraft may comprise a wing connected to the fuselage. The wing may comprise a rear spar. The rear spar may be the spar located closest to the trailing edge of the wing. The connection between the rear spar and the fuselage may be referred to as the root of the wing. The main strut may be connected to the wing. The main strut may be connected to the wing at the upper end of the strut. The main strut may be connected to the rear spar.

It may be that the main joint is configured to allow rotation about an axis such that transmission of drag loads via said joint is reduced and/or prevented. It may be that the connection between the main strut and the aircraft permits rotation about an axis extending in the spanwise direction (for example an axis lying substantially parallel to the pitch axis of the aircraft). Allowing rotation about a spanwise axis may effectively isolate the point at which the main strut is connected to the aircraft from the drag loads, reducing the amount of load that is transferred to the aircraft at that point. Thus, it may be that the majority of the drag loads, for example substantially all of the drag loads are transmitted to the aircraft via the sidestay assembly. By passing the drag component of the landing gear loads to the aircraft via the sidestay assembly, the maximum landing gear loads that must be reacted at the wing may be reduced.

It may be that the main joint is configured to allow rotation about an axis such that transmission of torsional loads via said joint is reduced and/or prevented. It may be that the connection between the main strut and the aircraft permits rotation about a vertical axis (for example an axis lying substantially parallel to the yaw axis of the aircraft). Allowing rotation about a vertical axis may effectively isolate the point at which the main strut is connected to the aircraft from the torsional loads, reducing the amount of load that is transferred to the aircraft at that point. Thus, it may be that the majority of the torsional loads, for example substantially all of the torsional loads are transmitted to the aircraft via the sidestay assembly. By passing the torsional component of the landing gear loads to the aircraft via the sidestay assembly, the maximum landing gear loads that must be reacted at the wing may be reduced.

It may be that the main joint is configured to allow rotation about an axis such that transmission of lateral loads via said joint is reduced and/or prevented. It may be that the connection between the main strut and the aircraft permits rotation about a longitudinal axis (for example an axis lying substantially parallel to the roll axis of the aircraft). Allowing rotation about the longitudinal axis may effectively isolate the point at which the main strut is connected to the aircraft from the lateral loads, reducing the amount of load that is transferred to the aircraft at that point. Thus, it may be that the majority of the lateral loads, for example substantially all of the lateral loads are transmitted to the aircraft via the sidestay assembly. By passing the lateral component of the landing gear loads to the aircraft via the sidestay assembly, the maximum landing gear loads that must be reacted at the wing may be reduced.

It may be that the connection between the main strut and the aircraft permits movement in all three rotational degrees of freedom. Thus, the main joint may be configured to allow movement in three rotational degrees of freedom. It may be that the connection between the main strut and the aircraft prevents translational movement in one or more than one degree of translational freedom, for example all three degrees of translational freedom.

The main joint may be located at the upper end of the main strut. The main strut may comprise one or more elements that make up the main joint. Said one or more elements may be located on the front side of the main strut. Thus the main strut may be connected to the wing via a main joint located forward of the strut. It may be that there is no connection between the main strut and the aircraft at the rear of the main strut. For example, it may be that there is no aft pintle.

The main joint may comprise a spherical bearing and a housing in which the spherical bearing is received. The main strut may comprise a spherical bearing. The spherical bearing may be received in a housing mounted on the aircraft, for example on the wing, for example on the rear spar of the aircraft. The main strut may comprise a shaft located in the region of, for example at, the upper end of the strut. The main strut may be connected to the aircraft via the shaft. The longitudinal axis of the shaft may extend substantially perpendicularly to the longitudinal axis of the strut. In the case that the joint between the aircraft and the main strut comprises a spherical bearing the spherical bearing may be located at a distal end of the shaft, for example the forward distal end of the shaft.

Each of the main strut, the forward stay and the rear stay may be connected to the aircraft via a joint. The landing gear may be configured such that loads are transferred from the landing gear to the aircraft via these three joints. The landing gear may comprise three landing gear loads paths via which substantially all the landing gear loads are transmitted to the aircraft from the landing gear. A different landing gear load path may go via each of the three joints.

The forward stay may be connected to aircraft at the wing, for example to the rear spar of the wing. The forward stay may connected to the wing in the region of the root of the wing, for example adjacent to the rear spar root joint. While a stay connected to the aircraft at the wing may still transfer some load into the wing, it may do so at a position further inboard than the main joint, and the angle of the forward strut to the wing means that loading transmitted to the wing via the stay will be more closely aligned with the bending loads experienced during flight (which the wing structure is sized to accommodate). The forward stay may be connected to the aircraft at the wing, for example adjacent to, but outboard of, the rear spar root joint. The forward stay may be connected to the aircraft at the fuselage. Connecting the forward stay to the fuselage may further reduce the amount of landing gear loads that must be reacted by the wing.

The fuselage may comprise a landing gear bay. The landing gear may be delimited at the rear end by a fuselage frame. The rear stay may be connected to the fuselage at the fuselage frame.

The shear web (or cross-brace) may be configured to reduce and/or limit movement of the forward stay relative to the rear stay. The shear web may be configured to maintain a portion of the first stay at substantially the same distance from a portion of the second stay. The shear web may be configured to maintain a portion of the first stay at substantially the same angular position relative to a portion of a second stay. In particular, the shear web may be configured to reduce and/or limit movement under shear loading.

The shear web may comprise a shear panel extending between the forward stay and the rear stay. The shear panel may comprise one or more recesses. The shear panel may comprise a recess configured to receive a portion of the main strut. The shear web comprise one or more members, for example a network of members extending between the forward stay and the rear stay. The shear web may be in the form of one or more cross-braces, for example.

In the case that the landing gear comprises a retractable landing gear (see below) each stay may be configured such that the length of the stay can vary as the landing gear moves between the extended and retracted configurations. Each stay may be configured to fold as the landing gear moves from the extended configuration towards the retracted configuration. Each stay may be configured to unfold as the landing gear moves towards the extended configuration from the retracted configuration.

It may be that each stay comprises an upper portion and a lower portion, the upper portion being pivotally connected to the lower portion and the aircraft. Each portion may comprise a single stay member. Each lower portion (or stay member) may be pivotally connected to an upper portion (or stay member) and the main strut. Thus, the stay assembly may comprise four stay members.

The landing gear may comprise a first shear web extending between the upper portions of the forward and rear stays, and a second shear web extending between the lower portions of the forward and rear stays. The second shear web may comprise a shear panel, for example a shear panel having a recess configured to receive a portion of the main strut when the landing gear is in a retracted configuration.

Each stay may be inclined at an angle to the longitudinal axis of the aircraft. It may be that at least one of the stays is inclined to the horizontal plane (i.e. the plane which is parallel to both the roll axis and the pitch axis of the aircraft) by an angle greater than 20 degrees when the landing gear is deployed/extended. The forward stay may extend from an outboard point to an inboard point, the inboard point being located forward of the outboard point. For example, it may be that when the landing gear is deployed/extended, the forward stay extends from an outboard point to an inboard point, the inboard point being located forward of the outboard point. The rear stay may extend from an outboard point to an inboard point, the inboard point being located aft of the outboard point. For example, it may be that, when the landing gear is deployed/extended, the rear stay extends from an outboard point to an inboard point, the inboard point being located aft of the outboard point. It may be that, when the landing gear is deployed/extended, the rear stay and the forward stay extend from an outboard point to an inboard point and converge.

The aircraft may be a commercial aircraft, for example a commercial passenger aircraft. The aircraft may capable of transporting more than fifty passengers, for example more than one hundred passengers, for example more than one hundred and fifty passengers, or an equivalent amount of cargo.

The landing gear may be a retractable landing gear. Thus, the landing gear may be mounted for movement between an extended (for use on landing and during taxiing) and a retracted configuration (for use during cruise). The landing gear may be configured to transmit landing gear loads to the aircraft when the landing gear is in the extended configuration. The landing gear may be configured such that the main strut rotates about an axis lying substantially parallel to the roll axis of the aircraft as the landing gear moves between the extended and retracted configuration. The connection between each stay and the aircraft may allow for rotational movement such that the stay can pivot relative to the aircraft when the landing gear is retracted. The landing gear may comprise a lock assembly configured to hold the sidestay assembly in place (e.g. prevent rotation of the stays relative to the aircraft) when the landing gear is deployed. It may be the case that the main strut of the landing gear, when the landing gear deployed, is arranged so that its longitudinal axis is substantially vertical. Other geometries are possible however.

The landing gear may comprise one or more wheels, for example two, four, six, eight, or more than eight wheels. The wheels may be connected to the landing gear at the lower (or distal) end of the main strut. The landing gear may comprise a trailing arm, e.g. an arm extending rearward from the region of the distal end of the strut and having one or more wheels mounted thereon. The landing gear may comprise a torque link. The landing gear may comprise a shock absorber.

It will be appreciated that throughout this specification, the terms inboard and outboard refer to the relative position of two elements along the spanwise axis of the aircraft. Thus, the inboard sidestay assembly may be referred to as such because the sidestay assembly is located inboard of the main strut. Similarly, the terms forward and rear (or aft) refer to the relative position of two elements along the longitudinal axis of the aircraft. Thus, the rear stay may be referred to as such because it is located further aft than the forward stay.

In another aspect of the invention, there is provided a landing gear configured for use as the landing gear of the first, and/or any other, aspect of the invention.

In another aspect of the invention, there is provide a method of retracting a landing gear. The landing gear may comprise a main strut, the main strut being connected at one end to the aircraft. The landing gear may comprise an inboard sidestay assembly. The inboard sidestay assembly may be connected to the main strut. The inboard sidestay assembly may comprise a forward stay connected at one end to the aircraft. The inboard sidestay may comprise a rear stay connected at one end to the fuselage. The inboard stay assembly may comprise a shear web extending between the forward stay and the rear stay and configured to resist movement of the forward stay relative to the rear stay, for example, under shear loading. The method may comprise moving the landing gear between an extended position and a retracted position by rotating the main strut about an axis of rotation extending substantially parallel to the longitudinal axis (or roll axis) of the aircraft.

The method may comprise allowing the length of each stay to vary as the landing gear retracts. The method may comprise allowing the upper portion of each stay to pivot relative to the fuselage and the lower portion of the stay as the landing gear retracts and/or extends. The method may comprise allowing the lower portion of each stay to pivot relative to the main strut and the upper portion of the stay as the landing gear retracts and/or extends. Thus, the method may comprise allowing each stay to fold as the landing gear retracts and/or unfold as the landing gear extends. It may be that the folding of the stay is the sole means by which its overall length, as measured in a given direction, is varied.

In another aspect of the invention, there is provided an aircraft comprising a fuselage and a landing gear. The landing gear may comprise a main strut, connected at one end to the aircraft by a first (or main) joint. The first joint may be located forward of the main strut. That is to say, the elements of the joint comprised within the main strut may be located at the front of the main strut, and the elements of the joint located on the aircraft may be located forward of the main strut. The landing gear may further comprise an inboard sidestay assembly. The sidestay assembly may be attached at a first end to the main strut. The sidestay assembly may be connected to the aircraft at a second end by a second joint and a third joint. At least one of the second and third joints may be connected to the aircraft, for example be mounted on the aircraft, at the fuselage. The landing gear may be arranged such that, in use, when the landing gear is extended, substantially all the landing gear loads are transferred from the landing gear to the aircraft via one or more of the first, second or third joints.

In another aspect of the invention, there is provided an aircraft comprising a fuselage and a landing gear. The landing gear may comprise a main strut coupled at one end to the aircraft. The landing gear may further comprise an inboard sidestay assembly coupled to the main strut. The inboard sidestay assembly may comprise a forward stay coupled at one end to the fuselage. The inboard sidestay assembly may comprise a rear stay coupled at one end to the aircraft. The inboard sidestay assembly may comprise a cross-brace extending between the forward stay and the rear stay to limit movement of the forward stay relative to the rear stay. The landing gear may be arranged such that, in use, on landing (e.g. when the landing gear is in the extended configuration), substantially all the landing gear loads are transferred from the landing gear to the aircraft via one or more of the main strut and the inboard stay assembly.

It will of course be appreciated that features described in relation to one aspect of the present invention may be incorporated into other aspects of the present invention. For example, the method of the invention may incorporate any of the features described with reference to the apparatus of the invention and vice versa. Throughout the specification the term 'or' will be taken to denote 'and/or' unless the context demands otherwise.

DESCRIPTION OF THE DRAWINGS

Embodiments of the present invention will now be described by way of example only with reference to the accompanying schematic drawings of which.

DETAILED DESCRIPTION

Figure 1:
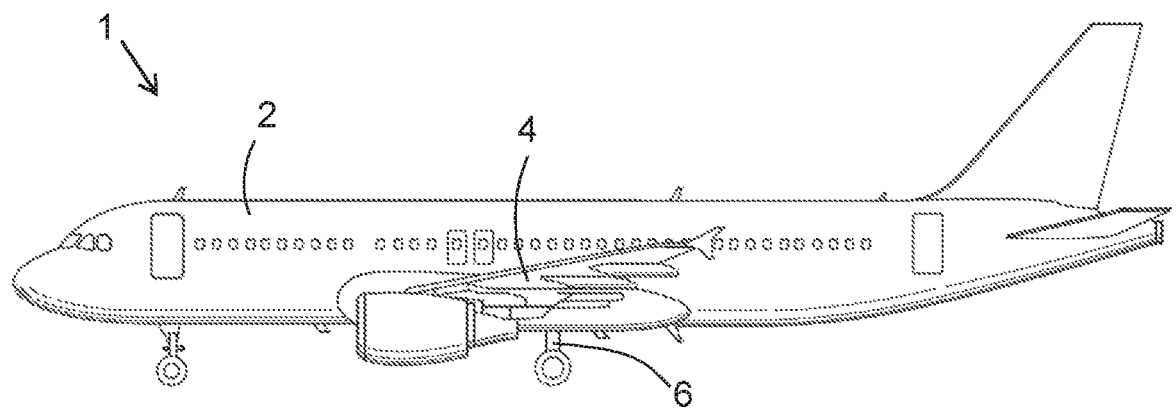
FIG. 1 shows a perspective view of an aircraft comprising a landing gear according to a first example embodiment of the invention.

FIG. 1 shows an aircraft 1 having a fuselage 2, a wing 4 and a main landing gear 6 in accordance with a first example embodiment of the invention.

Figure 2:
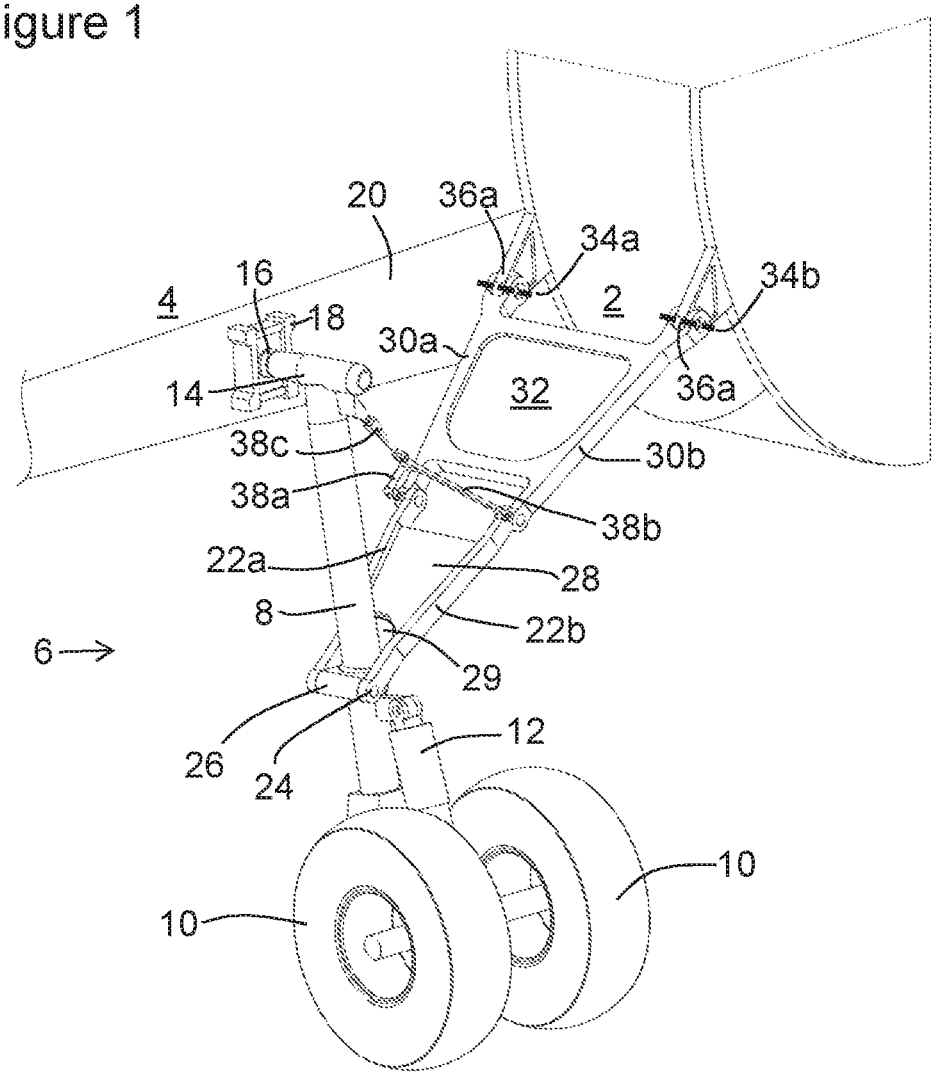
FIG. 2 show a close-up view of the landing gear of the first embodiment.

FIG. 2 shows a close-up of the landing gear 6 of the first embodiment when the landing gear 6 is in the deployed position. The landing gear comprises a main strut 8 which extends vertically and is connected at the lower end to a trailing arm (not visible in FIG. 2) and a pair of wheels 10 in the conventional manner. A shock absorber 12 extends between the main strut 8 and the trailing arm. At the top of the strut 8 a shaft 14 extends perpendicular to the longitudinal axis of the main strut 8 in the fore-aft direction. A spherical bearing 16 is located at the front end of the shaft 14 (the left end of the shaft as shown in FIG. 2) and is received in a socket 18 mounted on a rear spar 20 of the wing 4. A first pair of stays 22 are pivotally connected at one end to the main strut 8 by a pin 24 received in a collar 26 affixed to the strut 8. One of the stays 22a is located forward of the main strut 8 (to the left of the strut in FIG. 2), while the other stay 22b is located to the rear of the main strut 8 (to the right of the strut in FIG. 2). The stays 22 extend upwards and inboard from the main strut 8 in the spanwise direction. A shear panel 28 extends between the stays 22 of the first pair, and has a semi-circular cut out 29 at its lower end. The first pair of stays 22 may be referred to as the 'lower' pair. A second, 'upper', pair of stays 30 are pivotally connected at one end to the upper end of the first pair of stays 22. A first upper stay 30a is connected to the first lower stay 22a, and a second upper stay 30b is connected to the second lower stay 22b. The upper pair of stays 30 extend upwards and inboards from the main strut 8 in the spanwise direction, with the distance between the two stays 30a, 30b increasing with distance away from the main strut 8. An upper shear panel 32 extends between the upper stays 30. The front upper stay 30a (i.e. the stay located further forward) is pivotally mounted to the rear spar 20 in the region of the root of the wing 4 via a pin 34a (illustrated schematically in FIG. 2) received in a mounting 36a. The upper rear stay 30b of the second pair is connected to the fuselage 2 at the rear of the landing gear bay (not shown) via a pin 34b (illustrated schematically in FIG. 2) received in a mounting 36b. A linkage 38 comprising three link members 38a, 38b, 38c extends between the strut 8 and the upper stays 30. A fore link member 38a meets an aft link member 38b at a junction. (The fore and aft link members may be integrally formed.) A central link member 38c is pivotally connected at one end to the upper end of the main strut 8 and is pivotally connected at the other end to the junction between the other two link members 38a, 38b. The fore link member 38a is pivotally connected at its lower end to the upper forward stay 30a at the lower end of that stay. The aft link member 38b is pivotally connected at its lower end to the upper rear stay 30b at the lower end of that stay.

On retraction of the landing gear (described in more detail below) linkage 38 is released to unlock the stays 22, 30 and the main strut 8 rotates inboard about an axis lying parallel to the roll axis of the aircraft. The pivotal connections between the main strut 8, lower stays 22 and upper stays 30 allow the stay assembly to fold, and a portion of the main strut 8 moves into the recess 29 to allow the gear to achieve a more compact retracted configuration. In other embodiments, not shown, the lower portion of each lower stay 22 may be curved to provide space to accommodate the strut adjacent to the lower panel 28 when the gear is retracted. During retraction or extension the upper panel 32 and lower panel 28 limit movement of the front stays 22a, 30a relative to the corresponding rear stay 22b, 30b. This may help to ensure that the landing gear follows its intended retraction path. It also facilitates the use, between the main strut 8 and the wing 4, of the spherical joint, which provides movement in all three rotational degrees of freedom to be used.

The primary loads experienced by a landing gear 6 during landing may be categorised as vertical loads, drag loads and lateral loads. Typically, vertical loads act along an axis parallel to the vertical axis of the aircraft and are generated by the action of gravity on the mass of the aircraft, particularly during landing. Drag loads act along an axis substantially parallel to the longitudinal axis of the aircraft and are generated by friction between the tires and ground on 'spin up' of the wheels at touchdown and also when braking. Lateral loads act along an axis substantially parallel to the lateral axis of the aircraft and are generated during steering. The landing gear may also be subject to secondary loads such as torque loads and aerodynamic drag. On landing the drag loads on the strut 8 are reacted via the forward stays 22a, 30a (which are loaded in tension), and the rear stays 22b, 30b (which are loaded in compression), and transmitted to the aircraft via the pins 34 and mountings 36. The situation for the vertical loads is similar; the location of the wheels 10 to the rear of the main strut 8 creates a moment that is reacted by the stays 22, 30. The panels 28, 32 assist the stays 22, 30 in resisting these loads. The connection between spherical bearing 16 and its housing 18 permits rotation in all three rotational degrees of freedom and accordingly little or none of the drag load or vertical load is transmitted to the wing via that joint. Thus, a landing gear in accordance with the present example embodiment may provide reduced loading on the wing because drag and vertical loads are reacted at the fuselage 2 and the root of the wing 4 and not at the point at which the main leg attaches to the wing. In addition, those loads that are transmitted to the wing 4 via the forward stays 22a, 30a are near-parallel with the rear spar 20 and are thereby more closely aligned with the bending loads experienced by the wing in flight (and which the wing is sized to accommodate). Lateral loads may be transmitted to the aircraft 1 via both the joint at the top of the main strut 8 and the sidestays 22, 30.

Figure 3:
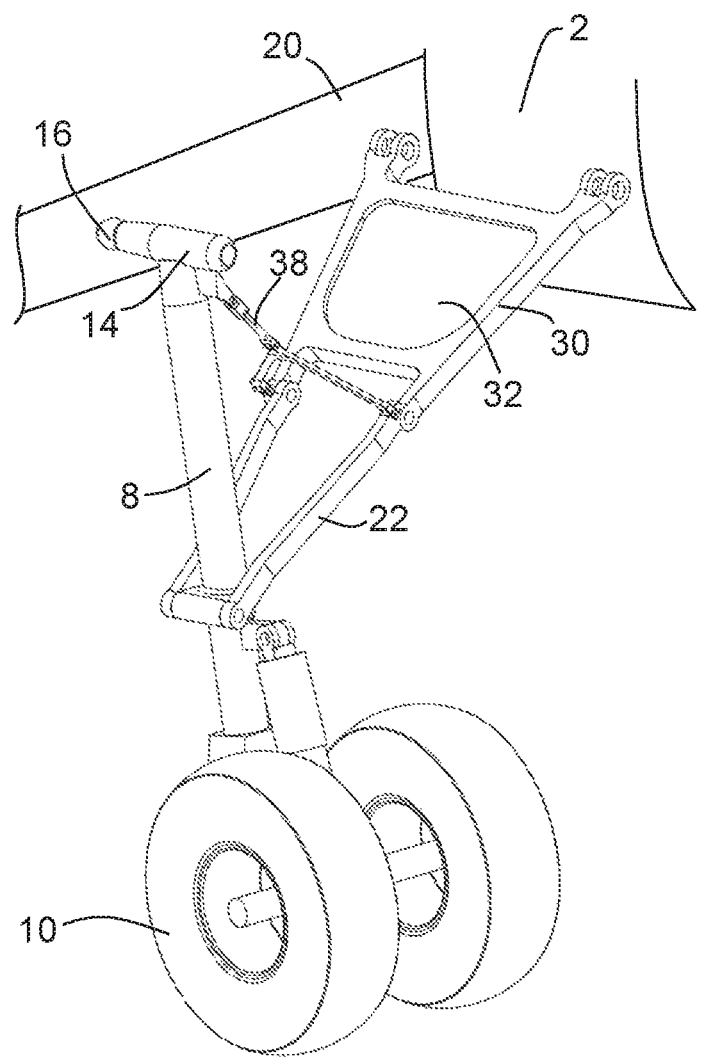
FIGS. 3 to 5 show a landing gear in accordance with a second example embodiment of the invention in the deployed, an intermediate and the retracting configurations respectively.
Figure 4:
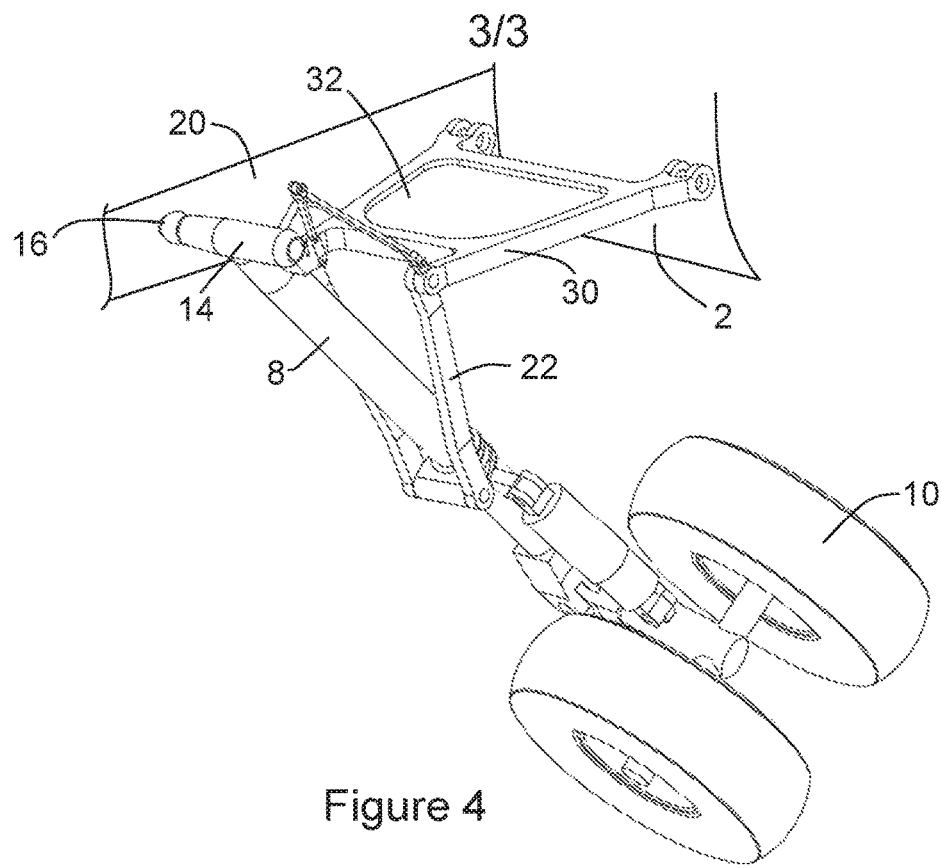
Figure 5:
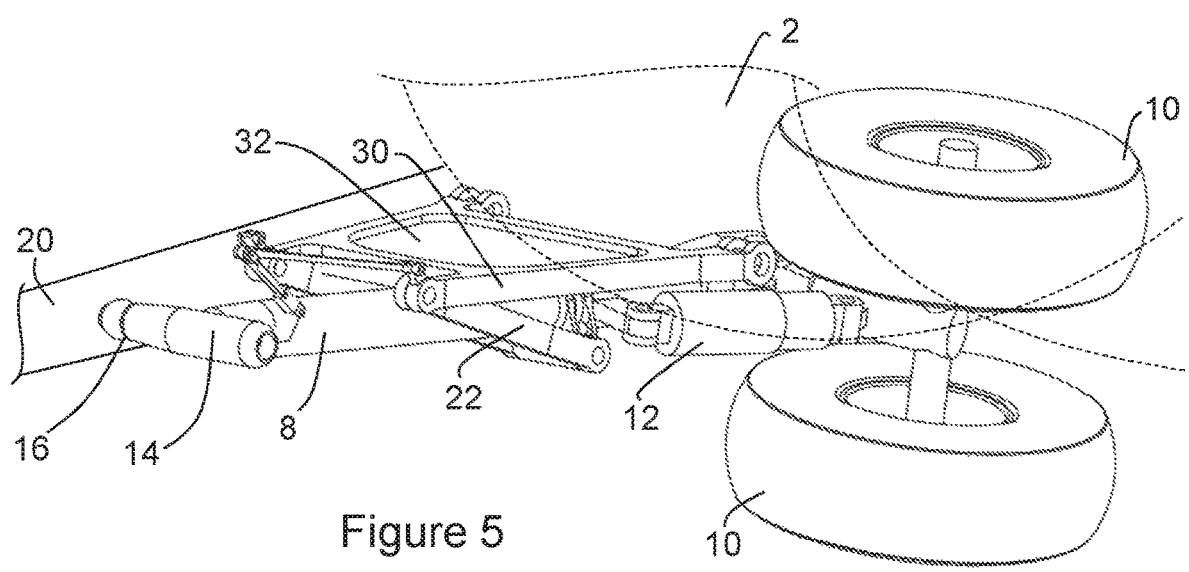

FIGS. 3 to 5 show a landing gear 6 in accordance with a second example embodiment in the deployed (FIG. 3), an intermediate (FIG. 4) and a retracted (FIG. 5) configuration. Only those elements of the second embodiment which differ significantly with respect to the first embodiment will be discussed here, and like reference numerals denote like elements. In contrast to the first embodiment which has both an upper panel 32 and a lower panel 28, the second embodiment has only a single upper panel 32 between the upper stays 30. It has been found that this may be sufficient to maintain the stays 22, 30 in alignment during retraction. Removing the lower panel 28 may reduce the weight of the landing gear and allow for more compact storage of the gear when retracted.

The socket 18 for receiving the spherical bearing 16, and the pins 34 and mountings 36, are not shown separately in any of FIGS. 3 to 5. The landing gear and stays are however mounted to the aircraft in a similar manner to that shown in FIG. 2.

In use, the gear is deployed or extended (as shown in FIG. 3) for landing and taxiing. After take-off the gear is retracted. First, the linkage 38 is released which frees the upper stays 30 to pivot relative to the lower stays 22. An actuator (not shown) then rotates the main strut inboard (anti-clockwise in FIG. 3) about the longitudinal axis of the shaft 14 and/or the longitudinal axis of the aircraft. As the main strut 8 rotates the lower stays 22 rotate anti-clockwise, while the upper stays 30 rotate clockwise. The linkage 38 also folds. In the intermediate position shown in FIG. 4 the wheels 10 are located inboard compared to their position in FIG. 3, and the point at which the upper stays 30 and lower stays 22 are connected has moved upwards. An increased portion of the length of the strut 8 lies within the area between the lower stays 22. In the retracted position shown in FIG. 5 the wheels 10 are located further inboard compared to their position in FIG. 4, and the strut 8 is nearly horizontal. (The shape of the fuselage is represented highly schematically in FIG. 5 by broken lines). The upper panel 32 lies immediately adjacent to the strut 8, with an increased portion (in comparison to FIG. 4) of the length of the strut 8, received between the lower stays 22. This process is carried out in reverse when the gear is deployed prior to landing. Thus, landing gear in accordance with the present embodiment may provide a simpler retraction and extension kinematic and allow for more compact storage in the retracted configuration than prior art landing gear.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The embodiments above all involve a trailing arm landing gear having two wheels, it will be appreciated that the invention may also find application in other landing gear configurations, for example with more wheels and/or without the trailing arm. In the embodiments above, the shear web is in the form of a solid panel. However, it will be appreciated that the shear web may take other forms, for example a network of bracing members and/or a perforated panel. In the embodiments described above, the landing gear is mounted to the fuselage and a rear spar; in some circumstances a gear beam may be used to provide a mounting point for the main strut.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a fuselage and a retractable landing gear, the retractable landing gear comprising:
a main strut connected at one end to the aircraft via a main joint to cause landing gear loads to be transferred from the main strut into the aircraft via the main joint, and wherein the main joint permits movement in all three rotational degrees of freedom,
an inboard sidestay assembly connected to the main strut, the inboard sidestay assembly comprising a forward stay connected at one end to the aircraft to cause landing gear loads to be transferred from the main strut into the aircraft via the forward stay, a rear stay connected at one end to the fuselage to cause landing gear loads to be transferred from the main strut into the fuselage via the rear stay, and a shear web extending between the forward stay and the rear stay and configured to resist movement of the forward stay relative to the rear stay;
and wherein the landing gear is arranged such that, in use, when the landing gear is extended, substantially all the landing gear loads are transferred from the landing gear to the aircraft via one or more of the main joint, the forward stay and the rear stay.

2. An aircraft according to claim 1, wherein a wing is connected to the fuselage and the forward stay is connected to the aircraft at the wing.

3. An aircraft according to claim 2, wherein the forward stay is connected to the wing in the region of the root of the wing.

4. An aircraft according to claim 1, wherein the forward stay is connected to the aircraft at the fuselage.

5. An aircraft according to claim 1, wherein a wing is connected to the fuselage and the main strut is connected to the aircraft at the wing.

6. An aircraft according to claim 5, wherein the main joint is located at the front of the main strut.

7. An aircraft according to claim 5, wherein the wing comprises a rear spar and the main strut is connected to the wing at the rear spar.

8. An aircraft according to claim 1, wherein the main joint comprises a spherical bearing.

9. An aircraft according to claim 1, wherein the shear web comprises a shear panel extending between the forward stay and the rear stay.

10. An aircraft according to claim 1, wherein each stay comprises an upper portion and a lower portion, the upper portion being pivotally connected to the lower portion and the aircraft.

11. An aircraft according to claim 10, wherein the lower portion is pivotally connected to the upper portion and the main strut.

12. An aircraft according to claim 10, wherein the landing gear comprises a first shear web extending between the upper portions of the forward and rear stays, and a second shear web extending between the lower portions of the forward and rear stays.

13. An aircraft according to claim 12, wherein the second shear web comprises a shear panel having a recess configured to receive a portion of the main strut when the landing gear is in a retracted configuration.

14. An aircraft according to claim 1, wherein the landing gear comprises a trailing arm mounted at the second end of the main strut.

15. An aircraft comprising a fuselage and a retractable landing gear, the retractable landing gear comprising:

a main strut connected at one end to the aircraft via a main joint to cause landing gear loads to be transferred from the main strut into the aircraft via the main joint, and wherein the main joint permits movement in all three rotational degrees of freedom, an inboard sidestay assembly connected to the main strut, the inboard sidestay assembly comprising a forward stay connected at one end to the aircraft, a rear stay connected at one end to the fuselage, and a shear web extending between the forward stay and the rear stay and configured to resist movement of the forward stay relative to the rear stay;

the method comprising moving the landing gear between an extended configuration and a retracted configuration by rotating the main strut about an axis of rotation extending substantially parallel to the longitudinal axis of the aircraft, and wherein the landing gear is arranged such that, in use, when the landing gear is extended, substantially all the landing gear loads are transferred from the landing gear to the aircraft via one or more of the main joint, the forward stay and the rear stay.

16. A method according to claim 15, wherein the length of each stay varies as the landing gear retracts.

17. A method according to claim 16, wherein each stay folds as the landing gear retracts.

* * * * *